United States Patent [19]

Szarka et al.

[11] Patent Number: 5,246,236
[45] Date of Patent: Sep. 21, 1993

[54] SEAL FOR LONG-TIME EXPOSURES IN OIL AND GAS WELL TOOLS

[75] Inventors: David D. Szarka; Allen E. Harris, both of Duncan, Okla.

[73] Assignee: Halliburton Company, Duncan, Okla.

[21] Appl. No.: 823,523

[22] Filed: Jan. 21, 1992

[51] Int. Cl.⁵ .............................................. F16J 15/28
[52] U.S. Cl. ................... 277/117; 277/190; 277/206 A; 277/236; 285/917
[58] Field of Search ............... 277/102, 108, 110, 112, 277/115, 116.2, 117, 190, 191, 205, 206 A, 236; 285/917

[56] References Cited

U.S. PATENT DOCUMENTS

| | | |
|---|---|---|
| 2,470,925 | 5/1949 | Fredrickson ................... 277/206 A |
| 3,047,300 | 7/1962 | Taylor et al. ................ 277/206 A X |
| 3,288,222 | 11/1966 | Urbanosky .................... 277/116.2 X |
| 3,387,656 | 6/1968 | Guest et al. . |
| 3,387,661 | 6/1968 | Evans et al. . |
| 3,489,098 | 1/1970 | Roth et al. . |
| 3,599,490 | 8/1971 | Love et al. . |
| 3,915,462 | 10/1975 | Bruns et al. ........................ 277/190 |
| 4,131,287 | 12/1978 | Gunderson et al. ............. 277/236 X |
| 4,178,020 | 12/1979 | Dopyera ......................... 277/236 X |
| 4,315,543 | 2/1982 | Luers et al. . |
| 4,452,462 | 6/1984 | Karr, Jr. . |
| 4,471,965 | 9/1984 | Jennings et al. . |
| 4,474,382 | 10/1984 | Hjelsand . |
| 4,477,085 | 10/1984 | Bridges et al. . |
| 4,477,091 | 10/1984 | Adamek . |
| 4,478,423 | 10/1984 | Hjelsand et al. . |
| 4,510,960 | 4/1985 | Jennings et al. . |
| 4,613,159 | 9/1986 | Harris et al. . |
| 4,766,956 | 8/1988 | Smith et al. .................. 277/116.2 X |
| 4,787,642 | 11/1988 | Etheridge ...................... 277/206 A |
| 4,796,858 | 1/1989 | Kabel . |
| 4,815,770 | 3/1989 | Hyne et al. ...................... 285/917 X |
| 4,823,871 | 4/1989 | McEver et al. ................. 277/236 X |
| 5,044,672 | 9/1991 | Skeels et al. ................... 277/236 X |

OTHER PUBLICATIONS

Publication entitled "a breakthrough seal technology", published by FMC Corporation, undated but admitted to be prior art.
FMC Wellhead Equipment Marketing Bulletin No. 1003, dated Jan., 1985.
Publication entitled "FMC research teams answer the fire-resistant challenge with a surprisingly simple-and-versatile-design", Autumn, 1984.
Publication entitled "New FMC Wellheads and Trees Will Endure A 2000° F. Fire Without Adding Fuel To It.", published by FMC Wellhead Equipment Division, dated Fall, 1985.
Publication entitled "ThermaLok TM Seals For Fire Resistant Wellhead Equipment", published by Gray Tool Company, Apr. 1983.
Publication entitled "Metallic Sealing Technology in Downhole Completion Equipment", JPT, Oct., 1990.

Primary Examiner—William A. Cuchlinski, Jr.
Assistant Examiner—Scott W. Cummings
Attorney, Agent, or Firm—James R. Duzan; Neal R. Kennedy

[57] ABSTRACT

A seal for long-time exposures in oil and gas well tools. The seal is adapted for use in a sealed joint between two relatively movable members. In particular, the seal is designed for relatively slidable members. The seal has a body portion with a pair of annular arms extending from opposite sides thereof. A lip on each of the arms is adapted for engaging one of the relatively movable members. An elastomeric sealing element may be disposed in a groove in the body portion for dynamic sealing between the first and second members. Pusher rings may be disposed on opposite sides of the seal so that the seal may be clamped against one of the relatively movable members without the lips or arms longitudinally engaging either of the relatively movable members or a lock ring used to clamp the seal in place.

4 Claims, 3 Drawing Sheets 5,246,236

SEAL FOR LONG-TIME EXPOSURES IN OIL AND GAS WELL TOOLS

BACKGROUND OF THE INVENTION

1. Field Of The Invention

This invention relates to seals for long-term usage in oil and gas well tools and the like, and more particularly, to seals for sliding sleeve-type closures designed to maintain a sealing connection for relatively long time periods, such as the life of the well.

2. Description Of The Prior Art

Sealing of components in oil and gas wells is of critical importance, both during the operation of downhole tools and for use in portions of the tools which remain in the well after completion, testing and production. For example, well apparatus with sliding closures frequently must be sealed during operation, and this sealing engagement must be maintained substantially indefinitely.

Prior art seals such as elastomeric seals can have problems over time in that the elastomer may lose resiliency or shape memory which is necessary for the seal to oppose the imposed squeeze forces thereon. This is a particular problem with exposure to downhole chemical and higher temperature environments of oil and gas wells for long periods of time. A seal is therefore required that remains operative in these types of environments.

Metal-to-metal seals have been developed because they are not affected by the chemicals and temperatures that are usually encountered. However, metal-to-metal seals are normally only used as static seals or as safety backup seals to standard elastomeric rotational or sliding seals because they have not been proven to be particularly suitable for use in dynamic sealing applications. One factor in the use of metal-to-metal seals is that the contacted sealing surfaces must be machined particularly smoothly and be free of pits and scratches so that a positive seal may be maintained. Damage to these surfaces can be caused by galling and scratching as the metal seal moves across the seal surface, and in such cases leakage is likely.

The present invention solves these problems by providing a new seal which incorporates the best aspects of metal-to-metal seals and elastomeric seals. In another embodiment, an improved metal-to-metal seal is also used to solve these problems.

SUMMARY OF THE INVENTION

The present invention may be described as an apparatus for sealing between a pair of relatively slidable or movable members. The apparatus comprises a body portion disposable between the pair of members, a pair of annular arms extending from a side of the body portion, another pair of annular arms extending from an opposite side of the body portion, and a lip disposed on each of the arms adapted for engaging one of the members such that the first pair of arms are deflected toward one another and the second pair of arms are deflected toward one another. The two pairs of arms provide sealing in both directions. The arms are preferably integrally formed with the body portion.

In a preferred embodiment, the apparatus further comprises elastomeric sealing means for dynamically sealing between the members as the members are relatively moved. The body portion preferably defines a groove therein, and the dynamic sealing means is characterized by an elastomeric seal disposed in the groove.

In one embodiment, the present invention is characterized as a seal assembly for sealing between relatively movable first and second members, the first and second members defining a cavity therebetween. The seal assembly comprises a seal disposed in the cavity with a pusher ring disposed adjacent thereto. The seal comprises a body portion, a pair of annular arms extending from the body portion and defining a groove therebetween, and a lip on each of the arms. Each lip is adapted for sealing engagement with the sealing surfaces on one of the first and second members. The pusher ring has a portion extending therefrom into the groove such that longitudinal engagement by the lips with either of the first and second members is prevented.

The seal may further comprise a second pair of annular arms extending from an opposite side of the body portion from the first mentioned pair of arms, and a lip on each of the second pair of arms for sealing engagement with the sealing surfaces of one of the first and second members. A second pusher ring is disposed on an opposite side of the seal and has a portion extending into the groove between the second pair of arms such that longitudinal engagement with the lips on the second pair of arms with the first and second members is prevented.

The seal assembly further comprises clamping means for clampingly engaging one of the pusher rings and thereby clamping the seal and the pusher rings to one of the first and second members.

The apparatus of the present invention further includes a sealed joint comprising a first member having a sealing surface defining first and second diameters, a second member having a sealing surface defining first and second diameters, the first and second members being relatively movable between first and second positions, and a seal defined between the first and second members. The seal comprises a body portion defining a groove therein, first and second annular arms extending from a side of the body portion and defining an annular groove therebetween, and third and fourth annular arms extending from an opposite side of the body portion from the first and second annular arms and defining an annular groove therebetween. First, second, third and fourth lips are disposed on the first, second, third and fourth arms, respectively. The first and third lips are spaced from the first diameter of the sealing surface of the first member when the first and second members are in the first position. The first and third lips are adapted for sealing engagement with the second diameter of the sealing surface of the first member when the first and second members are in the second position. The second and fourth lips are adapted for sealing engagement with the second diameter of the sealing surface of the second member. The seal in the seal joint further comprises an elastomeric sealing element disposed in the groove and adapted for sealing engagement with the first diameter of the sealing surface of the first member when the first and second members are in the first position and for tighter sealing engagement with the second diameter of the sealing surface of the first member when the first and second members are in the second position.

Numerous objects and advantages of the invention will become apparent as the following detailed description of the preferred embodiments is read in conjunc-

DESCRIPTION OF THE PREFERRED EMBODIMENTS

Figure 1:
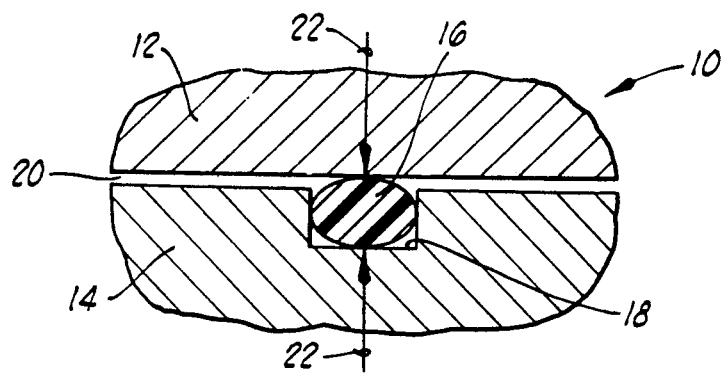
FIG. 1 shows a prior art elastomeric seal.

Referring now to the drawings, the details of a prior art elastomeric seal, a prior art metal-to-metal seal; and two embodiments of the seal of the present invention will be discussed.

PRIOR ART ELASTOMERIC SEAL

Figure 2:
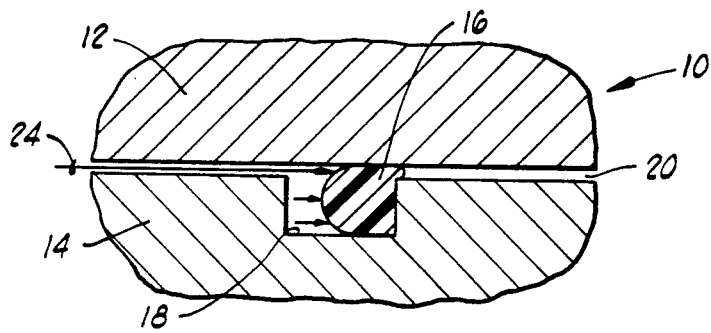
FIG. 2 shows the prior art seal of FIG. with a differential pressure applied thereacross.

Referring now to FIGS. 1 and 2, a prior art seal joint 10 is shown. Joint 10 comprises a first member 12 adjacent to a second member 14 with an elastomeric sealing means, such as seal 16, disposed therebetween and providing sealing engagement. Normally, seal 16 is disposed in a groove 18, and first and second members 12 and 14 have a slight gap 20 therebetween.

Seal 16 is made of any of a variety of elastomeric materials. These elastomeric materials are commonly, and almost exclusively, used for seals designed to hold differential fluid pressures because the elastomeric materials have an inherent property that makes them ideal for this purpose. As illustrated in FIG. seal 16 is an 0-ring which, when placed in groove 18 between first and second members 12 and 14, has an imposed squeeze thereon as indicated by arrows 22. The elastomeric material has an inherent resiliency that causes it to oppose the squeeze force with an equal force. This provides the force necessary to hold the initial differential pressure.

Referring now to FIG. 2, the flexible nature of the elastomeric material allows a tighter seal to result as seal 16 is forced to the opposite side of groove 18. This pressure is indicated by arrows 24 in FIG. 2.

If the elastomeric material loses its resiliency or shape memory that allows for it to oppose the imposed squeeze force, the initial sealing action may be lost as well. This will sometimes happen with exposure of seal 16 to downhole chemical and temperature environments of oil and gas wells for long periods of time. That is, the chemical and temperature environment may cause the elastomeric material of seal 16 to lose its resiliency. Also, even in a relatively non-hostile environment, some elastomeric materials may age-harden and lose their resiliency over a period of time anyway.

Therefore, it is necessary to manufacture seals from materials that are not affected by hostile environments or which are not subject to these age-hardening problems.

Prior Art Metal-to-Metal Seal

Figure 3:
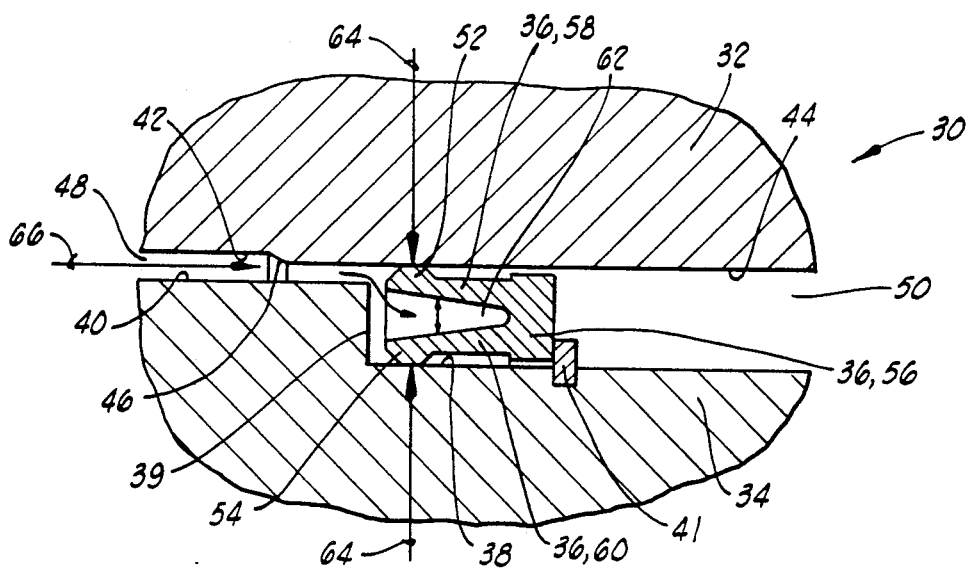
FIG. 3 illustrates a prior art metal-to-metal seal.

Referring now to FIG. 3, a prior art seal joint 30 is shown in which a first member 32 is positioned adjacent to a second member 34 and a metal-to-metal seal 36 is disposed therebetween for providing sealing engagement.

First member 34 has a first diameter 38 and a second diameter 40 thereon with an annular shoulder 39 extending therebetween. As illustrated, seal 36 is disposed on diameter 38 adjacent to shoulder 39. A retainer ring 41 holds seal 36 in place.

First member 32 has a surface formed by a first diameter 42 and a second diameter 44 with a chamfer 46 extending therebetween. First diameter 42 and surface 40 define a first gap 48 therebetween, and second diameter 44 and surface 40 define a second gap 50 therebetween. It will be seen that gap 48 is larger than gap 50 and that seal 36 engages second diameter 44 on first member 32 when in the sealing position shown in FIG. 3.

Seal joint 30 is assembled by first positioning seal 36 and retainer ring 41 in place and sliding second member 34 to the right with respect to first member 32. First diameter 42 is sized such that seal 36 does not engage first diameter 42. That is, seal 36 does not engage first member 32 until it comes in contact with chamfer 46 which gradually compresses the seal until it passes into second diameter 44. At this point, a first lip 52 is sealingly engaged with second diameter 44 of first member 32, and a second lip 54 is engaged with diameter 38 in second member 34.

Seal 36 has a main body portion 56 with a first annular arm 58 and a second annular arm 60 extending therefrom. First lip 52 is on the end of arm 58 opposite from body 56, and second lip 54 is on second arm 60 opposite from body 56. A substantially V-shaped annular groove 62 is defined between arms 58 and 60.

When seal 36 is in the position shown in FIG. 3, the inherent resiliency of arms 58 and 60 result in an imposed squeeze applied to seal 36 at first and second lips 52 and 54 as indicated by arrow 64 in FIG. 3. That is, arms 58 and 60 deflect and act to provide opposite spring forces which press first and second lips 52 and 54 tightly against first and second members 32 and 34, respectively. When a differential pressure is applied to seal 36, as indicated by arrows 66, it will be seen that first and second arms 58 and 64 are further forced in opposite directions, thereby increasing the seal force applied by lips 52 and 54 against first and second members 32 and 34.

Such metal-to-metal seals are sometimes used in downhole equipment for oil and gas wells because they are not affected by the chemicals and temperatures that are usually encountered in such wells. However, they are generally only used as static seals or as safety backups to standard elastomeric rotational seals because they have not proven to be particularly suitable for use in dynamic sealing applications.

One reason why metal-to-metal seals are unsatisfactory for dynamic seal applications is that the resistance of the metal-to-metal seals to the imposed squeeze force must be very high to achieve a fluid-type positive seal. This high spring force causes extremely high frictional forces that hinder the rotational or reciprocating movement of a dynamic seal. Also, the contacting sealing surfaces, second diameter 44 on first member 32 and diameter 38 on second member 34 must be machined to be extremely smooth and free of pits and scratches so that a positive seal can be maintained. Damage to these surfaces, particularly to second diameter 44 and lip 52, can be caused by galling and scratching as the high spring force metal seal 36 moves across the sealing surface of second diameter 44. Obviously, when the sealing surface is damaged, the metal-to-metal seal is not able to compensate.

One wellhead equipment manufacturer, FMC-Wellhead Equipment Division uses a thermally activated metal seal as a backup to a standard elastomeric operating stem seal because the frictional force of a metal-to-metal seal is too great to allow hand operation of the valve-operated stem. The metal seal is activated by increasing temperature when the valve is exposed to high thermal conditions, such as a wellhead fire.

First Embodiment

Figure 4:
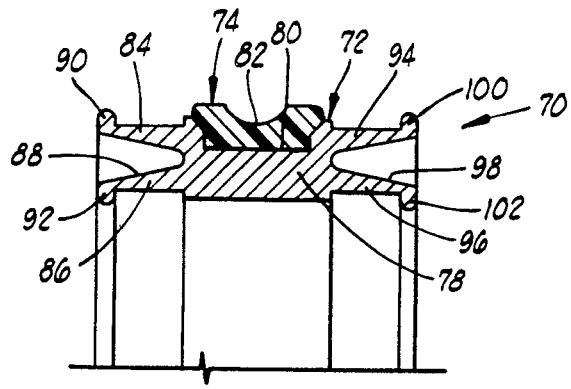
FIG. 4 shows an uninstalled first embodiment of the seal of the present invention.

Referring now to FIG. 4, a first embodiment of the seal of the present invention is shown and generally designated by the numeral 70. Seal 70 includes a metal-to-metal seal portion 72 and elastomeric in-transit or dynamic seal portion 74.

Metal-to-metal seal portion 72 preferably comprises a central body portion 78 defining a large groove 80 in which dynamic seal 74 is disposed. Seal 74 preferably has a curved, annular groove 82 therein.

Extending from one side of central body portion 78 of metal-to-metal seal 72 are a pair of spaced annular arms 84 and 86. An annular, V-shaped groove 88 is defined between first and second arms 84 and 86. First arm 84 has an annular first lip 90 thereon, and second arm 86 has an annular second lip 92 thereon.

Extending from the other side of central body portion 78 are a pair of annular third and fourth arms 94 and 96. Third and fourth arms 94 and 96 define an annular, V-shaped groove 98 therebetween. Third arm 94 has an annular third lip 100 thereon, and fourth arm 96 has an annular fourth lip 102 thereon.

Preferably, metal-to-metal seal portion 72 is symmetric so that first and third arms 84 and 94 are substantially identical, and second and fourth arms 86 and 96 are substantially identical.

Figure 5A:
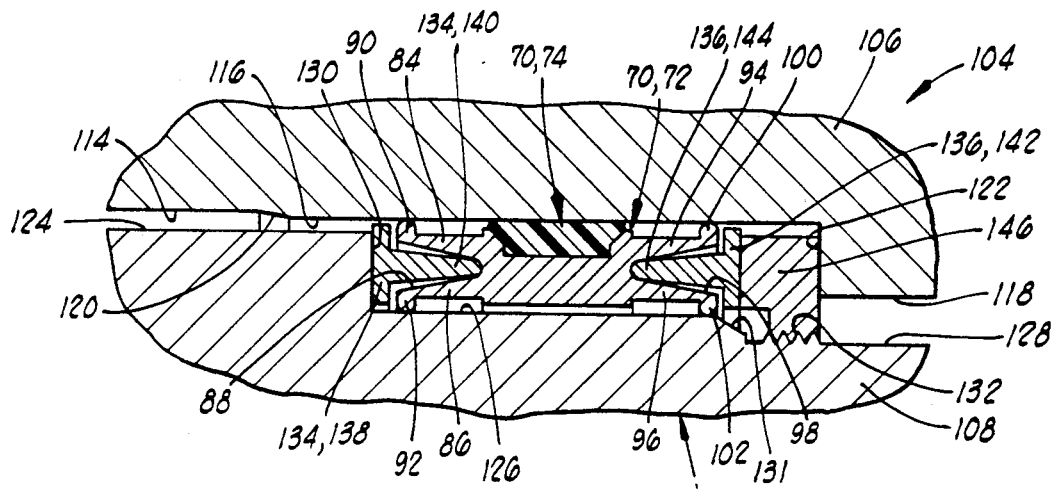
FIG. 5A is an enlarged detail of the seal shown in FIG. 5.
Figure 5:
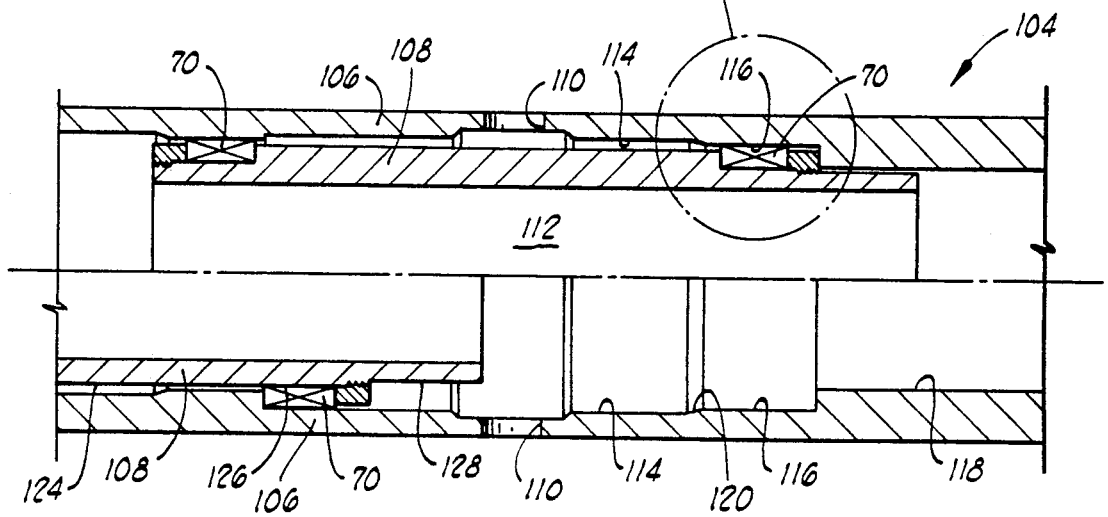
FIG. 5 shows the first embodiment seal installed in a sliding joint.

Referring now to FIG. 5, a pair of seals 70 are shown as part of a sliding, sealed joint 104. Sealed joint 104 includes a first member 106 and a second member 108 which are relatively slidable. The lower half of FIG. 5 shows second member 108 in a first, open position within first member 106 in which a port 110 is in communication with a central opening 112 through joint 104. The upper half of FIG. 5 shows first and second members 106 and 108 in a closed, sealed position in which port 110 and central opening 112 are no longer in communication.

In the embodiment illustrated, first member 106 is an outer member, second member 108 is an inner member, and second member 108 slides within first member 106. However, it should be understood that sealed joint 104 can follow many configurations, including one in which the outer member slides with respect to the inner member.

Referring now to FIG. 5A, the details of seal 70 within sealed joint 104 will be discussed.

First member 106 has a first bore 114, second bore 116 and third bore 118 which are progressively smaller. A chamfer 120 extends between first and second bores 114 and 116. An annular shoulder 122 extends between second bore 116 and third bore 118.

Second member 108 has a first outside diameter 124, second outside diameter 126 and third outside diameter 128 which are progressively smaller. An annular shoulder 130 extends between first outside diameter 124 and second outside diameter 126. A chamfer 131 and a threaded surface 132 are disposed between second outside diameter 126 and third outside diameter 128. Chamfer 131 prevents damage to lips 92 and 102 as seal 70 is installed.

It will be seen that first and second bores 114 and 116 in first member 106 are larger than first outside diameter 124 on second member 108. Also, third bore 118 in first member 106 is larger than third outside diameter 128 on second member 108.

A pair of pusher rings 134 and 136 are disposed on opposite sides of seal 72. Pusher ring 134 has a flange 138 adjacent to shoulder 130 and a tapered portion 140 which extends into groove 88 and bears against metal-to-metal seal portion 72. Similarly, pusher ring 136 has a flange 142 and a portion 144 with a tapered cross section which extends into groove 98.

A lock ring 146 is engaged with thread 132 on second member 108 so that it bears against flange 142 of pusher ring 136. It will thus be seen that seal 70 is clamped longitudinally against shoulder 130 between pusher rings 134 and 136 by lock ring 146.

Referring again to FIG. 5, as second member 108 slides with respect to first member 106, seal 70 is initially within first bore 114 in first member 106. Seal 70 is preferably constructed such that lips 90 and 100 on metal-to-metal seal portions 72 do not engage first bore 114. However, elastomeric seal portion 74 does sealingly engage first bore 114.

As lip 100 engages chamfer 120, arm 94 is deflected radially inwardly. Likewise, when lip 90 engages chamfer 120, arm 84 is deflected radially inwardly. It will be seen that when second member 108 is moved to the position shown in the upper half of FIG. 5 and in FIG. 5A, third and fourth lips 100 and 102 are pressed firmly against second bore 116 and second outside diameter 126, respectively, due to the inherent spring force of third and fourth arms 94 and 96. Similarly, first and second lips 90 and 92 are pressed firmly against second bore 116 and second outside diameter 126, respectively, due to the inherent spring force of first and second arms 84 and 86.

When elastomeric seal 74 engages chamfer 120 it is further compressed so that it is clamped into sealing engagement with second bore 116 when seal joint 104 is in the position shown in FIG. 5A.

Lock ring 146 also acts as a stop which engages shoulder 122 in first member 106 when sealed joint 104 is moved to its closed position.

Second Embodiment

Figure 6:
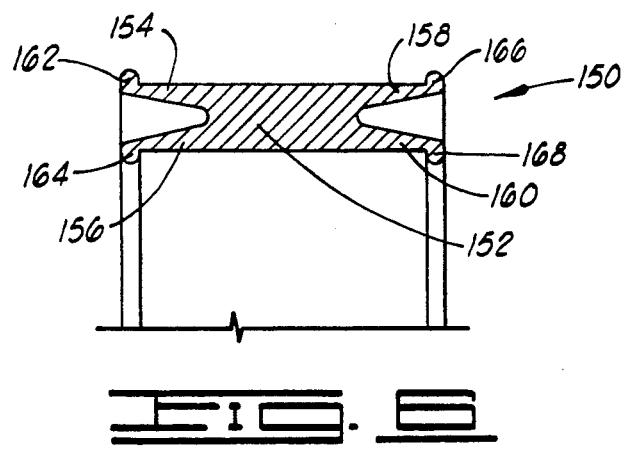
FIG. 6 illustrates an uninstalled second embodiment of the seal of the present invention.

Referring now to FIG. 6, a second embodiment of the seal of the present invention is shown and generally designated by the numeral 150. Seal 150 includes only a metal-to-metal seal portion with no elastomeric portions directly engaged therewith. Thus, second embodiment seal 150 is substantially the same as first embodiment seal 70 omitting dynamic seal portion 74. That is, seal 150 may be referred to as a metal-to-metal seal portion 150 which preferably comprises a central body portion 152 with annular first, second, third and fourth arms 154, 156, 158 and 160 extending therefrom. Each arm has a corresponding first, second, third and fourth lip 162, 164, 166 and 168 thereon. Preferably, seal 150 is symmetric so that first and third arms 154 and 158 are substantially identical, and second and fourth arms 156 and 160 are substantially identical.

Figure 7A:
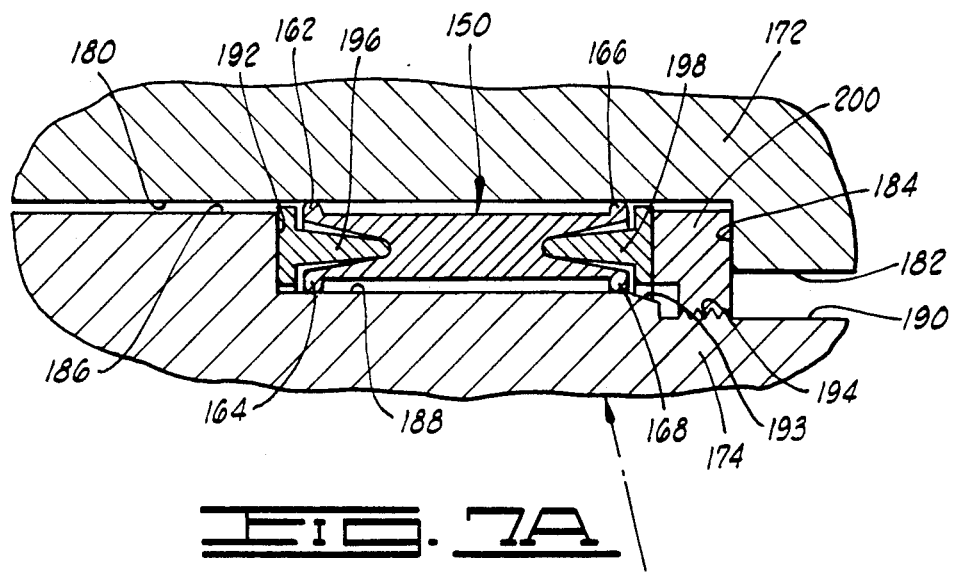
FIG. 7A is an enlarged detail of the seal shown in FIG. 7.
Figure 7:
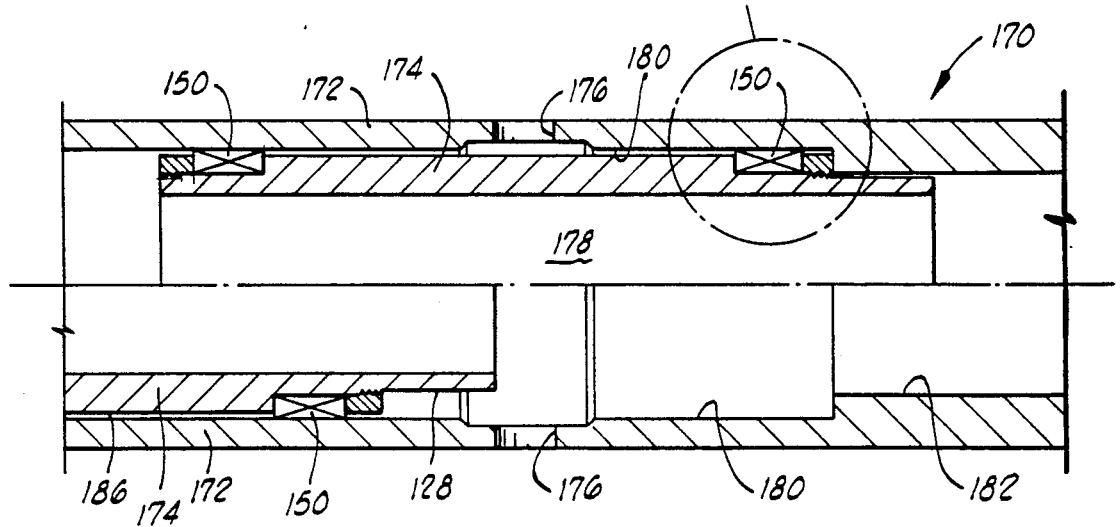
FIG. 7 shows the second embodiment seal installed in a sliding joint.

Referring now to FIG. 7, a pair of seals 150 are shown as part of a sliding, sealed joint 170. Sealed joint 170 includes a first member 172 and a second member 174 which are relatively slidable. The lower half of FIG. 7 shows second member 174 in a first, open position within first member 172 in which a port 176 is in communication with a central opening 178 through joint 170. The upper half of FIG. 7 shows first and second members 172 and 174 in a closed, sealed position in which port 176 and central opening 178 are no longer in communication.

In the embodiment illustrated, first member 172 is an outer member, second member 174 is an inner member, and second member 174 slides within first member 172. However, it should be understood that sealed joint 170 can follow many configurations, including one in which the outer member slides with respect to the inner member.

Referring now to FIG. 7A, the details of seal 150 within sealed joint 170 will be discussed.

First member 172 has a first bore 180 and a second bore 182 which is smaller than the first bore. An annular shoulder 184 extends between first bore 180 and second bore 182.

Second member 174 has a first outside diameter 186, second outside diameter 188 and third outside diameter 190 which are progressively smaller. An annular shoulder 192 extends between first outside diameter 186 and second outside diameter 188. A chamfer 193 and a threaded surface 194 are disposed between second outside diameter 188 and third outside diameter 190. Chamfer 193 prevents damage to lips 164 and 168 as seal 150 is installed.

It will be seen that first bore 180 in first member 172 is larger than first outside diameter 186 on second member 174. Also, second bore 182 in first member 172 is larger than third outside diameter 190 on second member 174.

A pair of pusher rings 196 and 198 are disposed on opposite sides of seal 150. Pusher rings 196 and 198 are substantially identical to pusher rings 134 and 136 in the first embodiment.

A lock ring 200 is engaged with thread 194 on second member 174 so that it bears against pusher ring 198. It will thus be seen that seal 150 is clamped longitudinally against shoulder 192 between pusher rings 196 and 198 by lock ring 200.

Referring again to FIG. 7, as second member 174 slides with respect to first member 172, seal 150 slides within first bore 180 in first member 172. That is, first and third lips 162 and 166 slide along first bore 180. Second and fourth lips 164 and 168 remain in engagement with second outside diameter 188 on second member 174. By properly sizing the components, and because pushing rings 196, 198 and lock ring 200 prevent seal 150 from moving, seal 150 will provide consistent sealing engagement as second member 174 slides within first member 172. Also, once lock ring 200 engages shoulder 184, thereby acting as a stop when sealed joint 170 is in its closed position, seal 174 will maintain its sealing engagement substantially indefinitely in the manner of previous metal-to-metal seals because it is not susceptible to attack by heat or chemicals.

It will be seen, therefore, that the seal for long-time exposures in oil and gas well tools of the present invention is well adapted to carry out the ends and advantages mentioned as well as those inherent therein. While presently preferred embodiments of the seal have been shown for the purposes of this disclosure, numerous changes in the arrangement and construction of parts may be made by those skilled in the art. All such changes are encompassed within the scope and spirit of the appended claims.

What is claimed is:

1. A sealed joint comprising:
   a first member having a sealing surface defining first and second diameters;
   a second member having a sealing surface defining first and second diameters, said first and second members being relatively movable between first and second positions;
   an annular shoulder extending between said first and second diameters of said sealing surface of said second member;
   a seal disposed between said first and second members and comprising:
      a metal body portion defining a groove therein;
      first and second annular metal arms extending from a side of said body portion and defining an annular groove therebetween;
      third and fourth annular metal arms extending from an opposite side of said body portion from said first and second annular arms and defining an annular groove therebetween;
      first, second, third and fourth metal lips on said first, second, third and fourth arms, respectively, wherein:
         said first and third lips are spaced from said first diameter of said sealing surface of said first member when said first and second members are in said first position;
         said first and third lips are adapted for metal-to-metal sealing engagement with said second diameter of said sealing surface of said fist member when said first and second members are in said second position; and
         said second and fourth lips are adapted for metal-to-metal sealing engagement with said second diameter of said sealing surface of said second member; and
      an elastomeric sealing element disposed in said groove in said body portion and adapted for sealing engagement between said first and second diameter of said sealing surface of said first member when said first and second members are in said first position and for tighter sealing engagement with said second diameter of said sealing surface of said first member when said first and second members are in said second position;
   clamping means for clamping said seal in a position adjacent to said shoulder;
   a first pusher ring disposed between said seal and said shoulder; and
   a second pusher ring disposed between said seal and said clamping means.

2. The sealed joint of claim 1 wherein said elastomeric sealing element has an annular groove therein.

3. The sealed joint of claim 1 wherein:
   said first pusher ring comprises:
      a flange portion engaged with said shoulder; and
      an annular portion extending from said flange portion into said groove between said first and second annular arms on said seal without deflecting said first and second annular arms; and said second pusher ring comprises:

a flange portion engaged with said clamping means; and an annular portion extending from said flange portion into said groove between said third and fourth annular arms on said seal without deflecting said third and fourth annular arms.

4. The seal joint of claim 1 wherein said annular portions on said first and second pusher rings have a tapered cross section.

* * * * *